United States Patent [19]
Pang et al.

[11] Patent Number: 5,574,517
[45] Date of Patent: Nov. 12, 1996

[54] AID FOR COLOR VISION DEFICIENCIES

[75] Inventors: Francis K. W. Pang, Toronto; Andrew K. T. Pang, Mississauga, both of Canada; Jia Z. Wang; Shu Y. Zheng, both of Haidian, China

[73] Assignee: Top One Optic Technology Inc., Toronto, Canada

[21] Appl. No.: 360,560

[22] Filed: Dec. 21, 1994

[51] Int. Cl.$^6$ .............................. G02C 7/10; G02B 1/10
[52] U.S. Cl. ............................................. 351/44; 359/581
[58] Field of Search .................. 351/41, 44, 45, 351/163, 165; 359/580, 581, 588, 591

[56] References Cited

U.S. PATENT DOCUMENTS

| | | | |
|---|---|---|---|
| 4,896,928 | 1/1990 | Perilloux et al. | 359/580 |
| 5,009,486 | 4/1991 | Dobrowolski et al. | 359/580 |
| 5,083,858 | 1/1992 | Girerd | 351/44 |

OTHER PUBLICATIONS

"Visual Aids for Correction of Red–Green Colour Vision Deficiencies", Can J Optom 1976; 38:38–46, Ingeborg Schmidt.

"Effect of X–Chrom Lens Wear on Chromatic Discrimination and Steropsis in Color–Deficient Observers", vol. 60, No. 4, pp. 297–302, 1983 American Journal of Optometry & Physiological Optics, Ellen R. Matsumoto, Chris A. Johnson and Robert B. Post.

"The X–Chrom Lens. On Seeing Red", vol. 25, No. 5, Mar.–Apr. 1981, Survey of Opthalmology, Irwin M. Siegel, Ph.D.

"An Experimental Test of Filter–Aided Dichromatic Color Discrimination", vol. 61, No. 4, pp. 256–264, Apr. 1984, Stuart Richer, Anthony J. Adams, American Journal of Optometry & Physiological Optics.

*Primary Examiner*—Huy Mai
*Attorney, Agent, or Firm*—Bereskin & Parr

[57] ABSTRACT

A visual aid for individuals with color vision deficiencies comprises a pair of optical elements shaped to be placed in front of an individual's eyes. An interference coating is applied to one surface of each element, preferably the back surface. The interference coating comprises a stack of dielectric film of selected structure. The stack of interference films is structured to give the optical elements pre-selected spectral transmission curves. An anti-reflection coating may be applied to the front surface of each element.

23 Claims, 2 Drawing Sheets

AID FOR COLOR VISION DEFICIENCIES

FIELD OF THE INVENTION

This invention relates to visual aids for individuals having colour vision deficiencies.

BACKGROUND OF THE INVENTION

Colour sensation is a unique physiological reaction of the human eyes to light stimulation. It is generally held that there exist three different kinds of cone cells on the retina of the human eye, which sense red, green and blue colours, respectively. Those with normal colour vision, sometimes referred to as normal trichromats, have cone cells which properly sense these three colours. However, colour vision deficiencies are created when one type of cone cells is completely defective, or all three types of cone cells are partially defective.

A complete defect of one kind of cone cells results in two colour sense. This condition is known as red-green colour blindness, and persons having this condition are called dichromats.

Dichromats can be divided into two subgroups, protanopes and deuteranopes. Both protanopes and deuteranopes perceive the colour spectrum as being blue, neutral and yellow. In the case of protanopes, the average neutral point is about 490 nm, and the average brightest point is about 540 nm, compared to about 555 nm with individuals with normal vision. In the case of deuteranopes, the average neutral point is about 500 nm, and the brightest point is about 560 nm.

A partial defect of all three types of cone cells also causes abnormal three colour sense, particularly when colours are in low saturation. This condition, known as red-green colour deficiency, is less severe than red-green colour blindness. Individuals suffering from this lesser condition are called anomalous trichromats, because while they can see all three colours, the matching process differs from normal trichromats.

There are two types of anomalous trichromats, protanomals and deuteranomals. Protanomals have "red-weak" colour sense, because they sense less red than normal trichromats. Deuteranomals have "green-weak" colour sense, because they sense less green than normal trichromats.

About 8% of the male population are believed to suffer from red-green colour blindness or colour vision deficiency. There is no known cure for hereditary colour blindness.

Over the years, however, various attempts have been made to create visual aids, which increase the ability to discriminate between colours. See Ingeborg Schmidt, "Visual Aids for Correction of Red-Green Colour Vision Deficiencies", Can J Optom 1976; 38:38–46, for a history survey. These visual aids typically take the form of coloured filters which assist in distinguishing between certain colours, by introducing differences in their brightness, colour or vividness, without enabling a colour-blind person to perceive colours in the normal fashion.

One of the earliest known visual aids for colour blindness comprised a red filter and a green filter which enabled those having red-green colour vision deficiency to distinguish some colours better by viewing them alternately through the filters. Other early visual aids utilized a pair of spectacles. In one case, a pair of spectacles having one green glass and one red glass allowed some colours to be distinguished by first closing one eye and then the other. In another case, the pair of spectacles included a green gelatin filter mounted in the upper half of the frame, which left the lower half clear. Single red filters, as well as single green filters, have also been found to help some colour-blind people. Magenta colour filters have been used to enhance chromaticness, i.e. to increase the quality of certain colours by enhancing their vividness or intensity. A more recently developed visual aid is the "X-Chrom" lens, a contact lens worn by colour deficient individuals on their non-dominant eye.

These prior art visual aids have not, however, achieved wide acceptance. While coloured filters allow individuals to distinguish colour differences indirectly through differences in brightness and so on, they do not create colours that have not been perceived before. Filters tend to reduce the number of colours that can be perceived. Most filters also reduce the overall amount of light entering the eye, making them unacceptable for use in low lighting conditions. Those visual aids which are worn in front of only one eye, such as the X-Chrom lens, are said to have certain deleterious effects, such as distorted depth perception. Colour vision aids utilizing colour filters, such as a pair of glasses with one green lens and one red lens, are generally not regarded as being acceptable or pleasing.

SUMMARY OF THE INVENTION

The present invention relates to a visual aid for individuals with red-green colour blindness or colour deficiency, hereinafter referred to collectively as colour vision deficiencies. The subject visual aid comprises a pair of optical elements, each element being dimensioned to be placed in front of the individual's eye. Each element has an interference coating applied to one surface thereof, comprising a stack of thin dielectric films of alternating low and high refractive index. The stack is structured to give the optical elements a preselected spectral transmission curve. It also provides a multi-coloured aesthetically pleasing reflective surface when viewed from the front.

The subject visual aid is preferably provided with one of three different types of interference coatings having different transmission curves. The thickness of the interference coating may vary from the top edge to the bottom edge of the optical element in order to raise the overall transmittance of the optical element.

The optical elements may be corrective glass or plastic lenses mounted in a pair of spectacle frames, as in the case of ordinary glasses. Alternatively, they may take the form of a pair of glass or plastic optical elements mounted in a "clip-on" frame, for use in conjunction with a pair of ordinary glasses. The subject optical elements may also take the form of contact lenses worn directly on the eye, subject to applicable health and safety requirements.

BRIEF DESCRIPTION OF THE DRAWINGS

The invention will now be described, by way of example only, by reference to the following drawings, in which.

DETAILED DESCRIPTION OF THE PREFERRED EMBODIMENT

Figure 1:
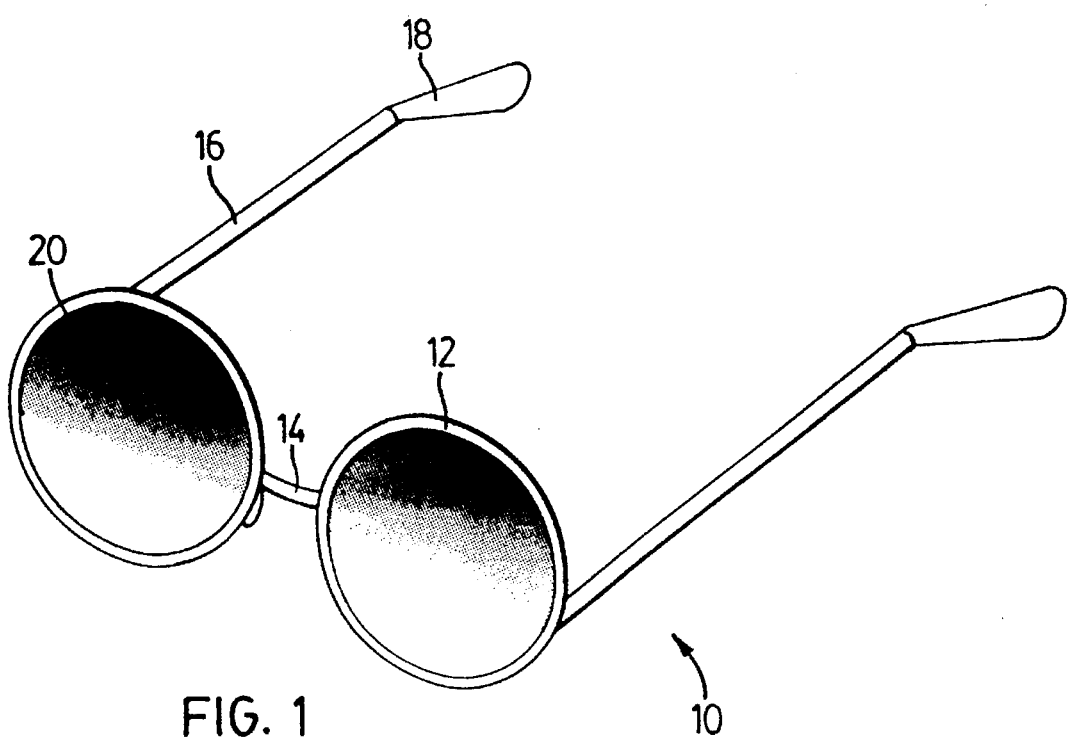
FIG. 1 is a perspective view of a pair of glasses embodying the subject invention.

Referring first to FIG. 1, illustrated therein is a pair of glasses or spectacles 10 incorporating a preferred embodiment of the subject invention. Spectacles 10 consist of a frame comprising a pair of lens rims 12 connected by a central nose piece 14, and a pair of temples or side portions 16 having distal ends 18 shaped to fit around the wearer's ears. Lens rims 12 are shaped to hold a pair of optical elements 20 made in accordance with the subject invention.

As shown, optical elements 20 are glass or plastic concave-convex corrective lenses shaped to correct common vision problems. However, it should be understood that the subject invention is not limited to corrective lenses, but can take the form of other optical elements, such as those having planar surfaces.

Figure 2:
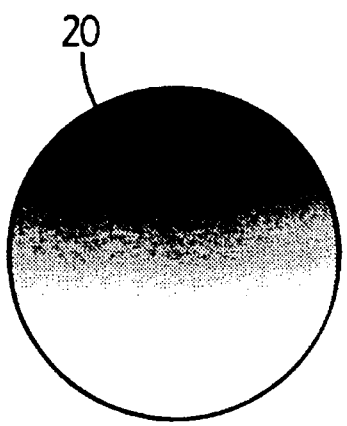
FIG. 2 is a side elevational view of one of the optical elements of the subject invention.
Figure 3:
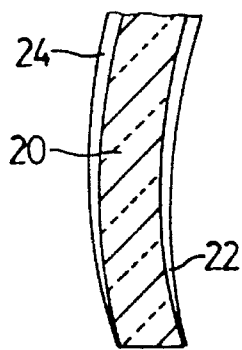
FIG. 3 is a sectional view of the optical element showing the thickness of the element and coatings in an exaggerated fashion.

Referring now to FIGS. 2 and 3, optical element 20 has applied thereto interference coating 22 on the concave back surface thereof and an anti-reflection coating 24 on the convex front surface thereof. Both coatings consist of multiple layers of thin dielectric films, created by a vacuum deposition process.

The interference coating comprises a stack of layers of dielectric film, of alternately high refractive index (H) and low refractive index (L) materials. In a preferred embodiment, interference coating 22 comprises 25–37 layers, having the following structure:

$$A/a\ H\ b\ (LH)^{8-x}\ c\ L\ d\ H\ (LH)^{8-y}\ e\ L\ f\ H/G$$

where a, f fall within the range 0.42–0.75, b falls within the range 0.85–1.54, e falls within the range 0.70–1.32, c falls within the range 1–1.54, d falls within the range of 1–1.42, x, y are integers which fall within the range 0–3, and where A represents the interface between the coating and air, and G represents the interface between the coating and the glass or other optical element. The total thickness of the coating is about 5–16 micrometers (μm). The L layers are preferably made of silicon dioxide and the H layers are preferably made of titanium dioxide.

Anti-reflection coating 24 comprises several layers of thin films, structured to reduce reflection of incident light. Coating 24 transmits a significant portion of the overall incident light, so as to raise the transmittance of optical element 20. Coating 24 may be made from layers of $TiO_2$, $Al_2O_3$ and ($SiO_2$ or $MgF_2$).

In the preferred embodiment, both the interference coating 20 and the anti-reflection coating 24 are graduated, in the sense that their thickness gradually decreases from the top to the bottom of the optical substrate. In the case of the interference coating, the thicknesses of individual layers may, for example, vary from a thickness in the range of 0.42 ¼ to 0.42 ½ at the top, to a thickness in the range of 0.42 ⅙ to 0.42 1/12 at the bottom. The result is that the optical element 20 not only transmits more light, but also takes on an aesthetically-pleasing multi-coloured "mirror" appearance when viewed from the front.

Figure 4:
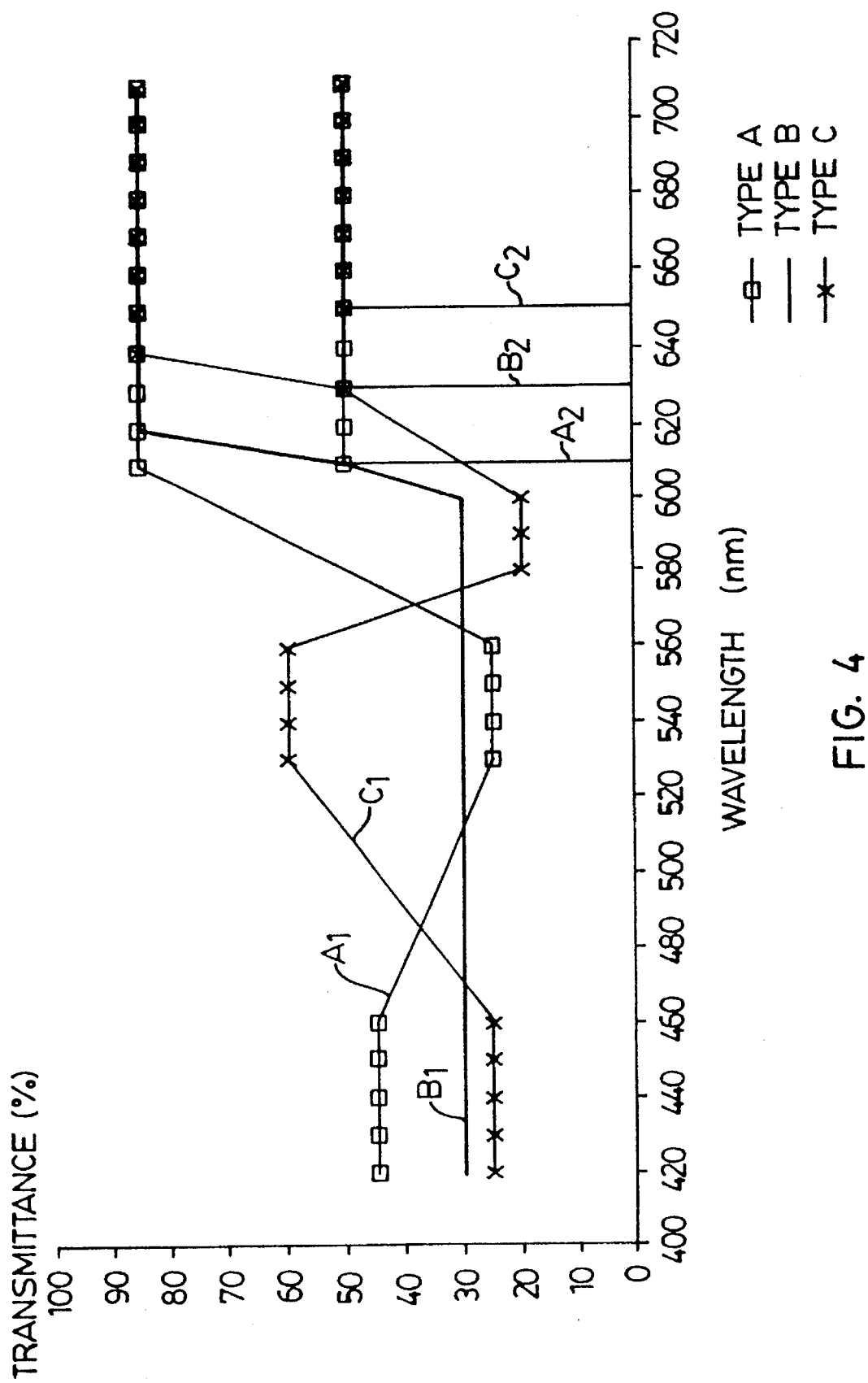
FIG. 4 is a graph showing the transmission curves for various embodiments of the subject invention.

FIG. 4 illustrates the spectral transmission curves for optical elements having three different types of interference coatings made in accordance with the subject invention. These three different coatings are designed to help individuals having certain forms of colour vision deficiency. The type A coating stimulates the cone cells which sense blue and red light, while transmitting a portion of yellow light. It increases the efficiency of red light absorption by the cone cells, and is intended for people of mild colour vision deficiencies. Type B helps stimulate red light sensing cone cells and enhances absorption of a large quantity of red light. It is intended for people of higher colour vision deficiencies. Type C stimulates red and green light sensing cone cells and enhances the contrast of black and white senses. It is intended for people of very high colour vision deficiencies.

Referring now to FIG. 4, curves $A_1$ and $A_2$ illustrate the spectral transmission characteristics of the type A coating. Curve $A_1$ indicates that the upper limit of the transmission rate for wavelengths ranging from about 420 nm–460 nm is about 45%, and that the upper limit of the transmission rate for the wavelengths ranging from about 530 nm–560 nm is about 25%. The lower limit in both of these ranges is about 1%. The upper limit of the transmission rate for wavelengths ranging from about 610 nm–710 nm is about 85%. The lower limit in the range of 610 nm–710 nm is about 50%, as shown by curve $A_2$.

Curves $B_1$ and $B_2$ illustrate the spectral transmission characteristics of the type B coating. As shown by curve $B_1$, the upper limit of the transmission rate for wavelengths ranging from about 420 nm–600 nm is about 30%. The lower limit in this range is about 1%. The upper limit at about 610 nm is about 50%. The upper limit of the transmission rate for the wavelengths from about 620 nm–710 nm is about 85%. The lower limit for the wavelengths ranging from about 630 nm–710 nm is about 50%, as shown by curve $B_2$.

Curves $C_1$ and $C_2$ illustrate the spectral transmission characteristics of the type C coating. Curve $C_1$ indicates that the upper limit of the transmission rate for wavelengths ranging about 420 nm–460 nm is about 25%. The upper limit of the transmission rate for wavelengths ranging from about 530 nm–560 nm is about 60%. The upper limit of the transmission rate for wavelengths ranging from about 580 nm–600 nm is about 20%. The lower limit in these ranges is about 1%. The upper limit at about 630 nm is about 50%. The upper limit in the range of about 640 nm–710 nm is about 85%. The lower limit for wavelengths in range of about 650–710 nm is about 50%, as shown by curve $C_2$.

The subject lenses are preferably mounted in a conventional glasses frame and worn in front of both eyes, so that depth perception problems created by wearing a filter over only one eye are eliminated. In this application, the optical elements 20 to which the coatings 20, 24 are applied take the form of a convex-concave or other shaped corrective lens. Alternatively, the optical element could take the form of a piece of glass or plastic having planar surfaces, mounted in conventional glasses frame or in the form of "clip-on" frames which can be manually mounted on a conventional pair of glasses.

In use, spectacles 10 can be worn like normal glasses. To assist in distinguishing between various colours, the individual can look through different portions of the lens, by turning his eye at different angles.

The use of graduated coatings raises the overall transmission rate, so that the user will not be as adversely affected by dim lighting conditions, as in the case of prior art devices.

The mirrored surface of the subject lenses makes the lenses more cosmetically acceptable than prior art visual aids having red or green coloured filters.

While the preferred embodiment of the invention comprises an interference coating on the back surface of the element (the surface closest to the wearer's eyes in use), the interference coating could be applied to the front surface of the element.

Accordingly, it should be understood that various changes can be made to the preferred embodiment described herein without departing from the subject invention, the scope of which is defined in the appended claims.

We claim:

1. A visual aid for individuals with red-green colour vision deficiencies, comprising a pair of optical elements shaped to be placed in front of an individual's eyes, the elements having an interference coating applied to one surface thereof, wherein the interference coating comprises a stack of thin dielectric films of alternating low and high refractive index, the stack being structured to give the optical elements a pre-selected spectral transmission curve for addressing a known form of colour-vision deficiency, wherein the maximum transmission rate for wavelengths from about 420 nm–460 nm falls within the range of about 45% to about 25%, the maximum transmission rate for wavelengths from about 530 nm–560 nm falls within the range of about 60% to about 25%, and the maximum transmission rate for wavelengths from about 640 nm–710 nm is about 85%.

2. The visual aid defined in claim 1, wherein the interference coating is applied to the back surface of the elements.

3. The visual aid defined in claim 1, wherein the minimum transmission rate for wavelengths from about 650 nm–710 nm is about 50%.

4. The visual aid defined in claim 1, wherein the elements also comprise an anti-reflection coating applied to the other surface of each element.

5. The visual aid defined in claim 1, wherein the interference coating varies in thickness from the top edge of the element to the bottom edge of the element.

6. The visual aid defined in claim 5, wherein the thickness of the interference coating gradually decreases from the top edge to the bottom edge of the element.

7. The visual aid defined in claim 6, wherein the thickness of each film gradually decreases from the top edge to the bottom edge of the element.

8. The visual aid defined in claim 1, wherein the interference coating provides a multi-coloured reflective surface, varying in colour and intensity from top to bottom.

9. The visual aid defined in claim 1, wherein the interference coating has the formula:

$$A/a\ H\ b\ (LH)^{8-x}\ c\ L\ d\ H\ (LH)^{8-y}\ e\ L\ f\ H/G$$

wherein A is the air interface, G is the optical element interface, H is a high refractive index layer, L is a low refractive index layer, a and f fall within the range of about 0.42 to about 0.75, b falls within the range of about 0.85 to about 1.54, e falls within the range of about 0.70 to about 1.32, c falls within the range of about 1 to about 1.54, d falls within the range of about 1 to about 1.42, and x and y are integers ranging from 0 to 3.

10. A visual aid for individuals with mild red-green colour vision deficiencies, comprising a pair of optical elements shaped to be placed in front of an individual's eyes, the elements having an interference coating applied to one surface thereof, wherein the interference coating comprises a stack of thin dielectric films of alternating low and high refractive index, the stack being structured to give the optical elements a pre-selected spectral transmission curve, wherein the maximum transmission rate for wavelengths from about 420 nm–460 nm is about 45%, the maximum transmission rate for wavelengths from about 530 nm–560 nm is about 25%, and the maximum transmission rate for wavelengths from about 610 nm–710 nm is about 85%.

11. The visual aid defined claim 10, wherein the maximum transmission rate decreases linearly from about 45% at about 460 nm to about 25% at about 530 nm.

12. The visual aid defined in claim 11, wherein the maximum transmission rate increases linearly from about 25% at about 560 nm to about 85% at about 610 nm.

13. The visual aid defined in claim 12, wherein the minimum transmission rate for wavelengths from about 610 nm–710 nm is about 50%.

14. A visual aid for individuals with moderate red-green colour vision deficiencies, comprising a pair of optical elements shaped to be placed in front of an individual's eyes, the elements having an interference coating applied to one surface thereof, wherein the interference coating comprises a stack of thin dielectric films of alternating low and high refractive index, the stack being structured to give the optical elements a pre-selected spectral transmission curve, wherein the maximum transmission rate for wavelengths from about 420 nm–600 nm is about 30%, and the maximum transmission rate for wavelengths from about 620 nm–710 nm is about 85%.

15. The visual aid defined in claim 14, wherein the maximum transmission rate increases linearly from about 30% at about 600 nm to about 50% at about 610 nm.

16. The visual aid defined in claim 15, wherein the maximum transmission rate increases linearly from about 50% at about 610 nm to about 85% at about 620 nm.

17. The visual aid defined in claim 16, wherein the minimum transmission rate for wavelengths from about 630 nm–710 nm is about 50%.

18. A visual aid for individuals with severe red-green colour vision deficiencies, comprising a pair of optical elements shaped to be placed in front of an individual's eyes, the elements having an interference coating applied to one surface thereof, wherein the interference coating comprises a stack of thin dielectric films of alternating low and high refractive index, the stack being structured to give the optical elements a pre-selected spectral transmission curve, wherein the maximum transmission rate for wavelengths of about 420 nm–460 nm is about 25%, the maximum transmission rate for wavelengths of about 530 nm–560 nm is about 60%, the maximum transmission rate for wavelengths of about 580 nm–600 nm is about 20%, and the maximum transmission rate for wavelengths from about 640 nm–710 nm is about 85%.

19. The visual aid defined in claim 18, wherein the maximum transmission rate increases linearly from about 25% at about 460 nm to about 60% at about 530 nm.

20. The visual aid defined in claim 19, wherein the maximum transmission rate decreases linearly from about 60% at about 560 nm to about 20% at about 580 nm.

21. The visual aid defined in claim 20, wherein the maximum transmission rate increases linearly from about 20% at about 600 nm to about 50% at about 630 nm.

22. The visual aid defined in claim 21, wherein the maximum transmission rate increases linearly from about 50% at about 630 nm to about 85% at 640 nm.

23. The visual aid defined in claim 22, wherein the minimum transmission rate for wavelengths from about 650 nm–710 nm is about 50%.

* * * * *